Feb. 7, 1939.  G. FAILLA  2,145,866
ELECTROTECHNIQUE
Filed Aug. 14, 1929  4 Sheets-Sheet 1
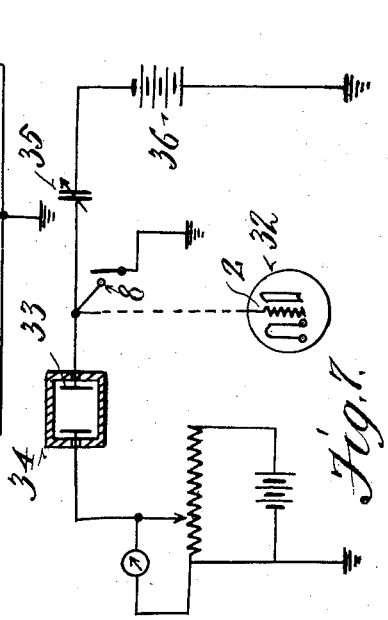
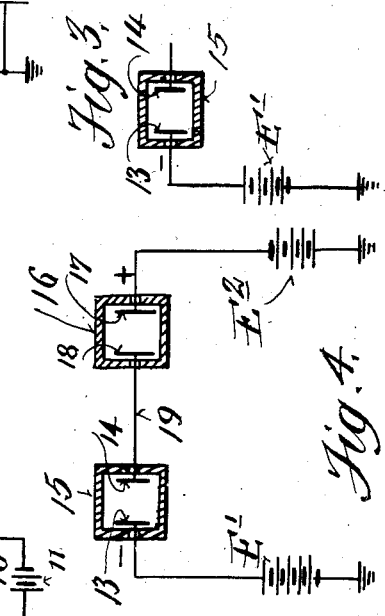
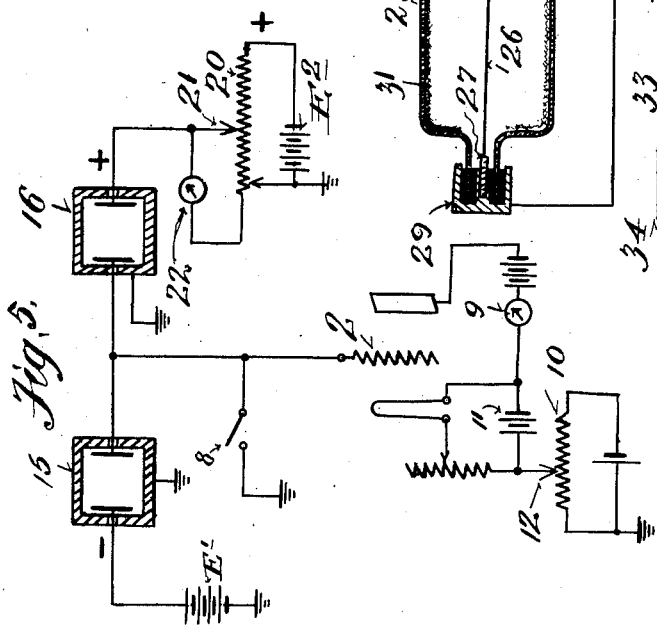
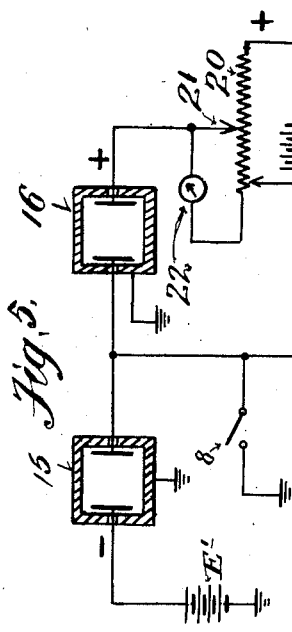
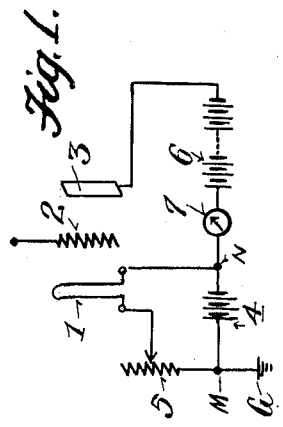
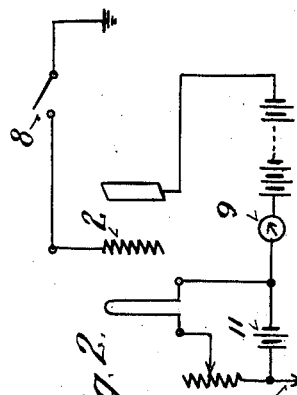
Inventor
Gioacchino Failla
By his Attorneys Darby & Darby

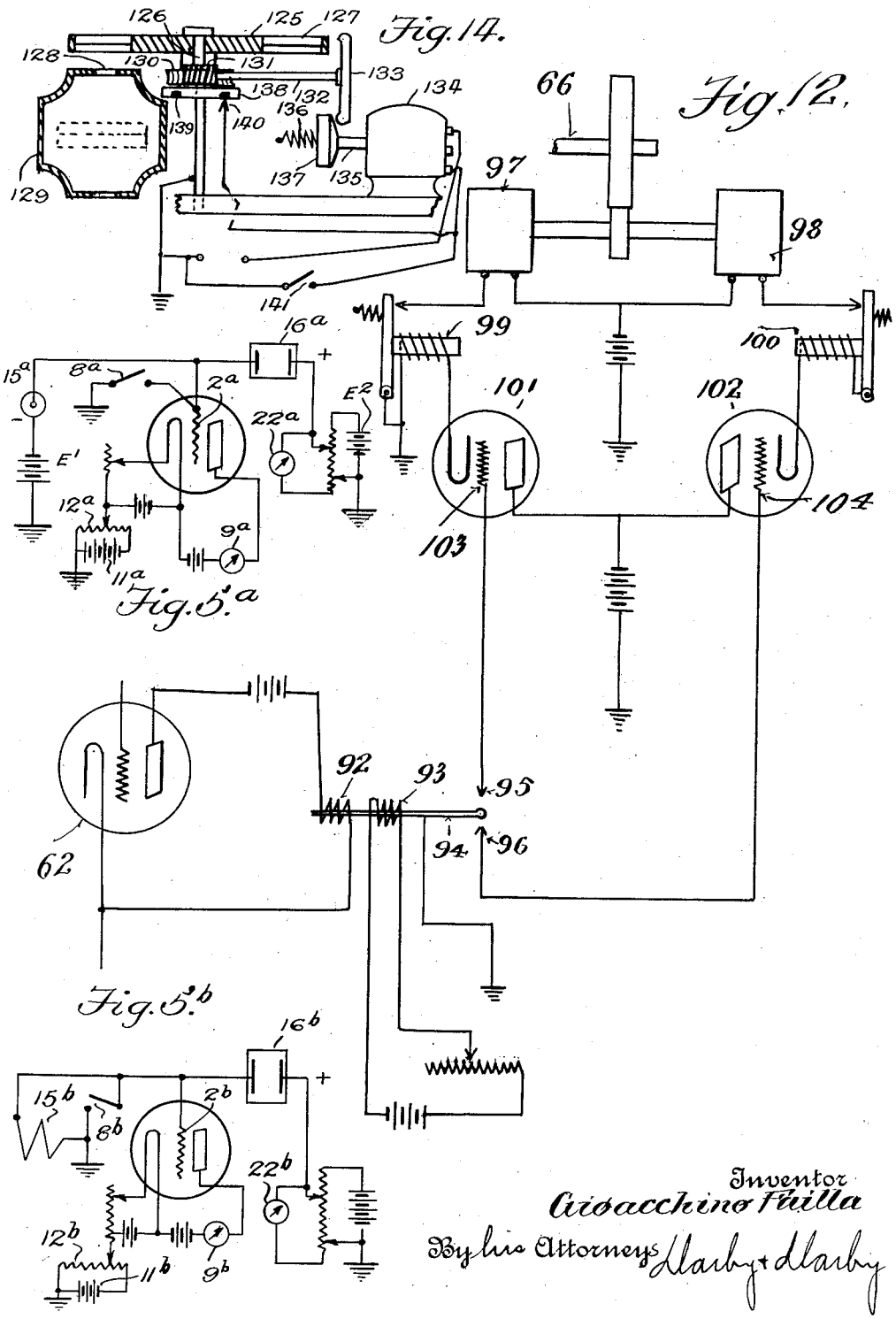

Feb. 7, 1939.  G. FAILLA  2,145,866
ELECTROTECHNIQUE
Filed Aug. 14, 1929  4 Sheets-Sheet 4
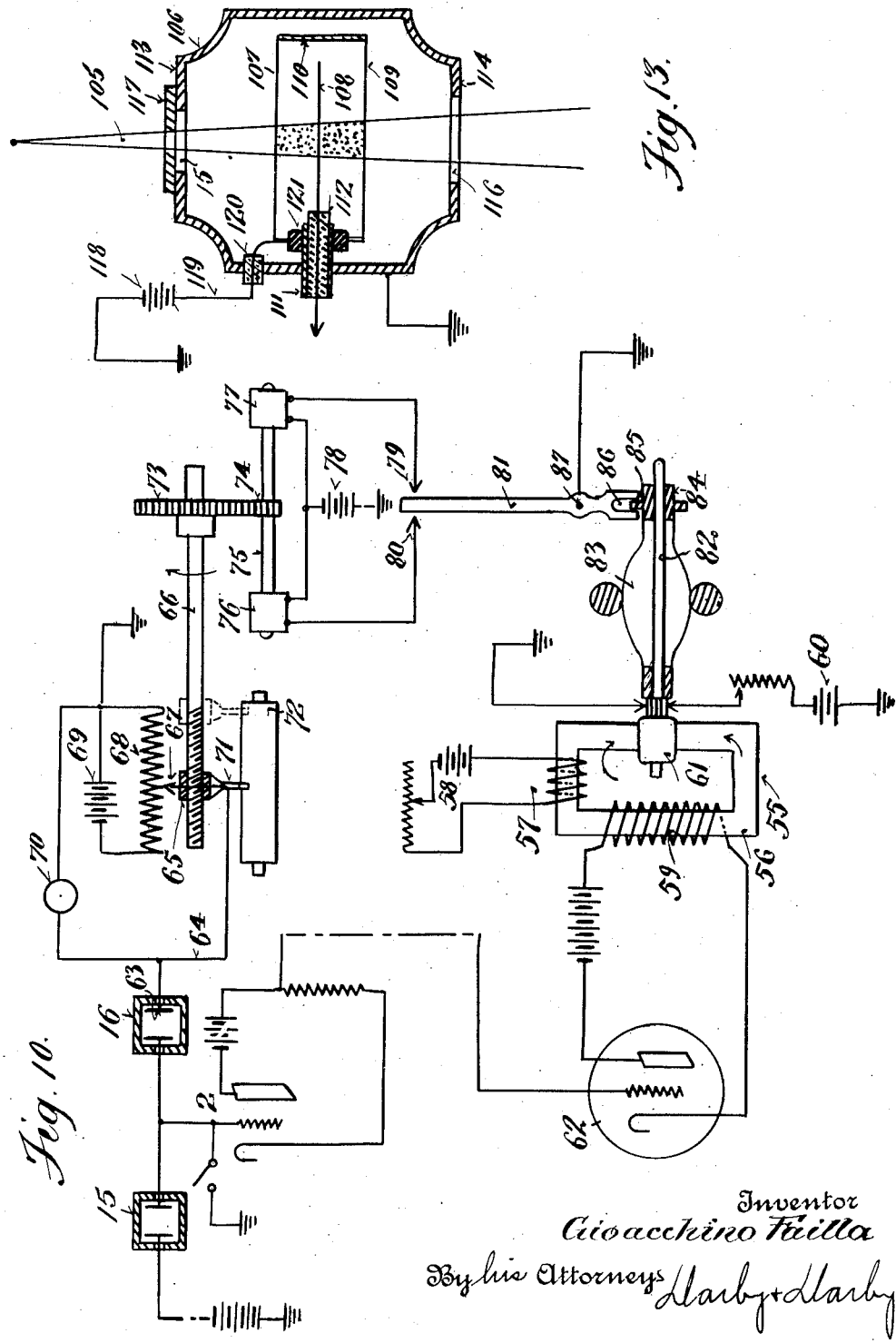

Patented Feb. 7, 1939

2,145,866

UNITED STATES PATENT OFFICE 2,145,866

ELECTROTECHNIQUE

Gioacchino Failla, New York, N. Y.

Application August 14, 1929, Serial No. 385,912

39 Claims. (Cl. 250—83)

This invention relates to electrotechniques and with particularity to methods and apparatus for testing, measuring, recording and utilizing energy variations.

One of the principal objects of the invention is to provide methods and means for detecting and measuring energy variations of very small magnitude. As notable examples of the fields within which this object can be achieved there may be mentioned specifically that of photo-electric phenomena, ionization phenomena and other kindred phenomena.

Another object is to provide methods for measuring very small energy values by a novel compensating scheme.

In achieving the last noted object it is proposed to utilize the sensitive characteristics of the well known multi-electrode vacuum tube by taking advantage of the space charge effect upon the controlling grid or grids thereof. While this object is achieved in its best effects by utilizing the so-called high vacuum type of tube, corresponding advantages may be obtained by employing any other type of space discharge device.

Another object of the invention is to provide a method and means for automatically compensating for energy variations.

A further object of the invention is to provide a method of detecting and amplifying very small energy changes without using extensive or complicated amplifying apparatus.

Another object of the invention resides in the method of using a multi-electrode vacuum tube of the controlling grid type to detect small electrical variations.

Another object of the invention is to provide methods and means for accurately measuring the intensity of radiations.

A feature of the invention resides in apparatus for enabling small electrical variations to be measured by comparing them with a standard source using the compared or combined effects thereof to control a space discharge device.

Another feature of the invention resides in the method and means for utilizing the space charge or static charge on the controlling element of a vacuum tube to detect very small electrical variations.

Another feature relates to the means for directly reading the intensity of radiations, such as X-rays, radium radiations and other similar phenomena.

A still further feature pertains to the means for measuring and/or recording electrical variations by a continuous and automatic compensation method.

Another feature of the invention resides in improved forms of ionization chamber with or without a standard source.

Another feature resides in the means for controlling the recording of minute electrical variations.

Another feature resides in the method and means of translating one form of energy variations into a different form and recording the latter in a continuous and automatic manner.

Other features and advantages of the invention not specifically enumerated will be apparent after a consideration of the following detailed description and the appended claims.

While the invention will be described and disclosed herein as applied to specific systems of measuring and recording it will be understood that the invention is not to be limited thereby but is capable of wide application in any situation where small energy variations are to be detected, measured, and/or recorded.

Referring to the drawings—

Figure 1 illustrates in schematic form a standard multi-electrode vacuum tube having a so-called "floating grid" to be used according to the invention;

Fig. 2 shows one manner of effecting and controlling the potential of the "floating grid" of Fig. 1;

Fig. 3 is a schematic representation of an ionization chamber which may be used in carrying out one of the objects of the invention;

Fig. 4 illustrates the manner of combining a series of ionization chambers to explain the compensation method according to the invention;

Fig. 5 illustrates the manner of controlling the currents through the ionization chambers of Fig. 4, together with the manner of combining therewith the circuit of Fig. 2;

Fig. 5a is a schematic arrangement showing the invention applied to the measuring of photo-electric currents;

Figure 8:
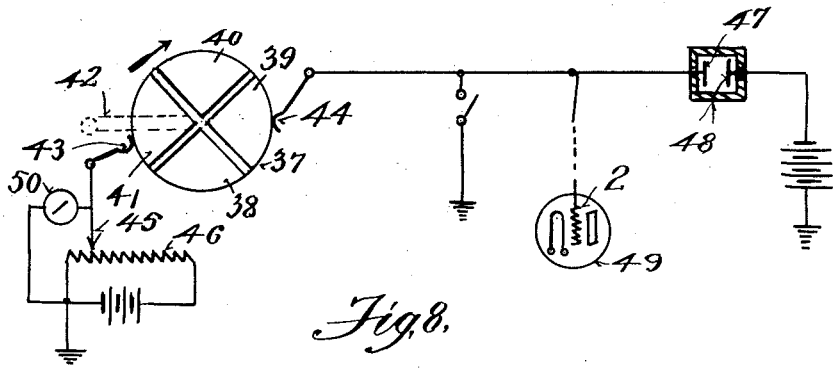
Figure 9:
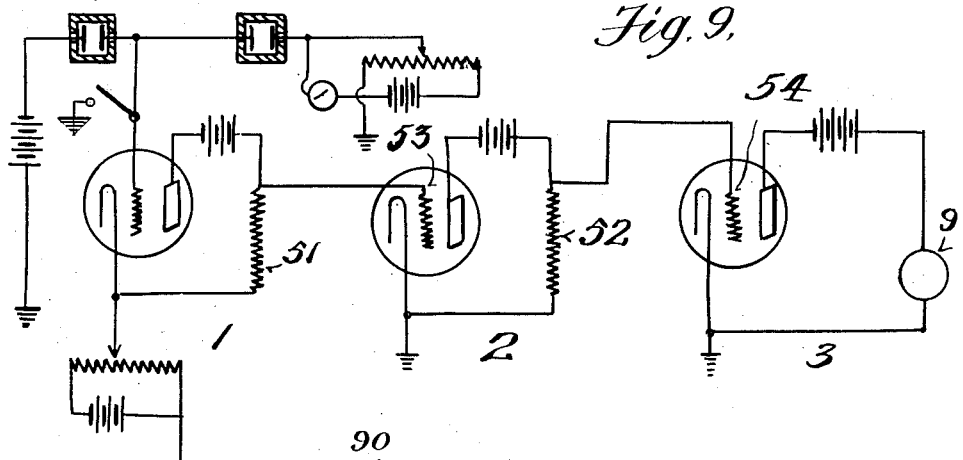
Figure 11:
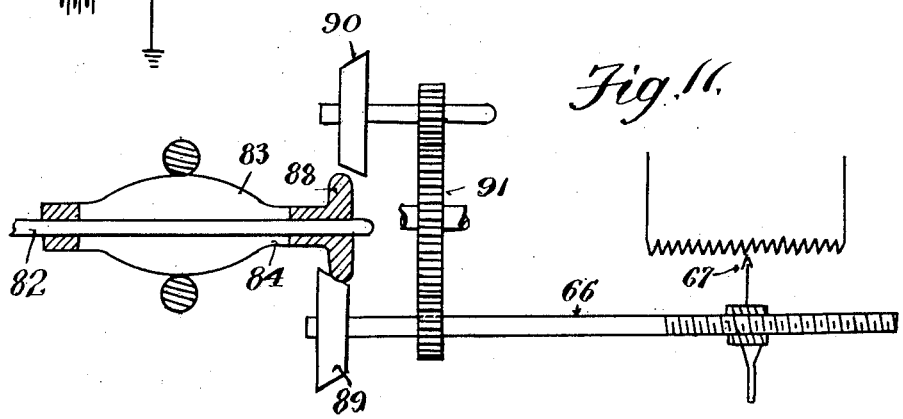

Fig. 5b schematically shows the invention applied to the measurement of thermo-electric currents;

Fig. 6 is a detail view showing a preferred form of compensating ionization chamber shown schematically in Figs. 4 and 5;

Fig. 7 illustrates a modified manner of utilizing the "floating grid" space discharge tube to measure energy values;

Fig. 8 illustrates another arrangement similar to that of Fig. 7 but employing an automatic and continuous compensation scheme;

Fig. 9 illustrates a preferred manner of employing the variations in the output circuit of the "floating grid" detector according to the invention;

Fig. 10 shows one arrangement of mechanism for continuously recording energy variations together with the means for automatically effecting the compensation to control the recorder;

Fig. 11 is a detail modification of an arrangement for effecting the compensation of Fig. 10; and Fig. 12 is a still further modified arrangement of mechanism for effecting automatic and continuous compensation according to the invention.

Fig. 13 shows a preferred form of X-ray measuring chamber.

Fig. 14 shows a modified manner of achieving the automatic compensation or balancing of the currents to be measured.

For the purpose of explanation, corresponding parts illustrated in the several figures of the drawings will bear the same designation characters.

Referring more particularly to Fig. 1, there is shown in schematic form any well known type of multi-electrode vacuum tube employing an electron emitting member or cathode 1, a controlling grid 2, and an anode or plate 3. While in Fig. 1 the cathode 1 is shown as being of the thermionically activated type, other types of cathodes may be employed and, further, while the cathode 1 is shown as of the filamentary type heated by a battery 4 through an adjustable resistance 5, it will be understood that any other manner of heating the cathode may be employed. A source of potential 6 is connected between the cathode and the anode in the usual manner but in series with an indicating device, such as a milliameter 7. As will be noted from an inspection of Fig. 1, the controlling grid 2 is conductively isolated from the electrodes 1 and 3. However, since the grid 2 is in the path of the electron stream flowing toward the plate 3, said grid acquires a certain negative charge. If the electrodes are properly insulated from each other within the tube and neglecting other insulation leakage, when equilibrium has been established throughout the circuit there is no current flowing to or away from the grid 2. The potential of the grid with respect to ground G will, therefore, depend on a number of factors, such as the design of the tube, the plate voltage employed, filament temperature, etc., and in particular will said grid potential depend upon the position of the ground connection G.

For example, when the point M is grounded the static grid potential will be different from its potential when the point N is grounded. It has been found possible, however, to make the difference of potential between the grid and ground zero, or any intermediate value, by applying a suitable biasing voltage at the point M or at the point N. Accordingly this biasing voltage is connected at either of said points in such a manner as to render said points, positive with respect to ground.

If now the grid 2 is connected through a suitable switch 8 (Fig. 2) to ground no change in the anode current is noted on the device 9 which may be a milliameter or other equivalent measuring instrument. It is assumed, of course, that the entire system is electrostatically isolated from extraneous disturbances. One preferred manner of adjusting the potential of the anode-cathode system with respect to ground so that the grid 2 assumes the ground potential is illustrated in Fig. 2 in which the anode-cathode system instead of being directly connected to ground, as in Fig. 1, is grounded through a potentiometer 10 and a suitable source of potential 11. The slider 12 of the potentiometer is adjusted in either direction until no change in the anode current is observed when the switch 8 is closed. After this adjustment has been made and the grid 2 brought to ground potential the anode-cathode system can be used to detect small potential differences with respect to ground as hereinafter described. It can also be used to determine when an insulated conductor is at ground potential by making a temporary contact between the conductor and the grid 2 after the latter has been previously brought to ground potential.

While in the system disclosed in Fig. 2 the base potential of the grid in the anode-cathode system is selected as a ground potential, it will be understood that any other fixed base potential may be employed. In what follows the term "base potential" refers to the potential of the grid in the anode-cathode system which is brought intentionally to any desired value plus or minus (including zero) with respect to ground. Thus if the device or system that is to be measured is itself at a different potential from ground, then the base potential of the anode-cathode system will be this latter potential. Although the arrangement of Fig. 2 may be utilized for detecting and measuring any potential difference, it is particularly well suited for the measurement or indication of small potential differences or variations. As one notable example of the use to which the arrangement of Fig. 2 may be put there may be mentioned the determination or indication of the intensity of radiations. As is well known, the passage of certain radiations (X-rays, radium rays, etc.) through a gas causes a certain number of the gaseous atoms to break up into positive and negative particles or ions. If these ions are formed in an electric field they move in the direction of the field but in opposite directions according to their polarity, the positive ions moving toward the negative electrode and the negative ions moving toward the positive electrode. The electric currents thus produced are usually termed "ionization currents." An ionization current therefore may be defined as any electric current resulting from the migration of ions, the ions carrying either a positive and/or a negative charge. Consequently, while an ionization chamber when subjected to ionizing radiations has certain of the characteristics of an ordinary ohmic resistance, nevertheless, functionally it acts in a different manner since actually there is produced in the chamber two separate currents, one consisting of positive charges traveling towards the negative electrode and the other consisting of negative charges traveling towards the positive electrode. Such currents in general are of very small magnitude and of the order of about $10^{-12}$ amperes and great difficulty has heretofore been encountered in accurately measuring such small currents. The usual practice is to employ a so-called "ionization chamber" which is generally in the form of a vessel with two or more electrodes insulated from each other and in which the ionization current to be measured is produced. Such ionization chambers are well known in the art and one is schematically represented in Fig. 3 in which the numerals 13 and 14 represent the electrodes suitably positioned within the enclosing chamber 15 and insulated therefrom and from each other.

If the difference of potential between the electrodes 13 and 14 is sufficiently high all the gaseous ions formed within the chamber may be moved to the electrodes before any substantial recombination will take place. Under these circumstances the flow is usually termed the "saturation current" which obviously is a measure of the pairs of ions produced per second in the gaseous volume. Other conditions being equal, the number of ions produced per second depends on the intensity of the radiation which is ionizing the gas. Hence the saturation current may be taken as a measure of the radiation. If, a negative voltage $E_1$ is supplied to the electrode 13 as the gaseous medium is ionized the positive ions will be attracted to the electrode 13 and the negative ions will travel to the insulated electrode 14 and will impart to the latter a negative charge. After a certain time, depending upon the physical conditions of the circuit, the electrode 14 assumes practically the same potential as the electrode 13.

Referring to Fig. 4, if two identical ionization chambers 15 and 16 are connected together, with the electrodes 13 and 17 connected respectively, to a negative potential $E_1$ and an equal positive potential $E_2$ and if the ionizations in each chamber are the same, the negative ions to the electrode 14, that is the positive ionization current, will be neutralized by the same number of positive ions collected by the electrode 18, that is by the negative ionization current. Electrodes 14 and 18 being connected together will, therefore remain at zero or ground potential. Accordingly if the wire 19 is brought in contact with the grid 2 of the vacuum tube, Fig. 2, there will be no change in the plate current.

An alternate explanation of Fig. 4 may be given as follows: In certain respects ionization chambers under the influence of ionizing radiations may be considered to be high resistances. Accordingly, ionization chambers 15 and 16, being identical and having the same degree of ionization, may be considered to be two high resistances $R_{15}$ and $R_{16}$ of equal magnitude R. We have then in Fig. 4 a series circuit in which a current of a certain magnitude I flows. Neglecting the internal resistance of the batteries and the resistance of the connecting leads, all of which are very small in comparison to R, we have:

$$E_2 - IR_{16} - IR_{15} + E_1 = O$$

Since $E_1 = E_2 = E$, the above equation reduces to $$2E - 2IR = O$$

or $$E - IR = O$$

Introducing subscripts again for convenience of reference to Fig. 4, we have $E_1 - IR_{15} = O$. Since one terminal of battery $E_1$ is grounded, the above equation indicates that point 19 in the circuit must be at ground potential, under these conditions.

Conversely, if we know that point 19 is at ground potential, then it follows that $$E_1 - IR_{15} = O \text{ or } E_1 = IR_{15}$$

and $$E_2 - IR_{16} = O \text{ or } E_2 = IR_{16}$$

Since we are dealing with a series circuit, the current must be the same in both equations, but $E_1$ need not be equal to $E_2$ and, similarly, $R_{15}$ need not be equal to $R_{16}$.

We may analyze the circuit of Fig. 5 from this point of view also. In this circuit we have a means for determining when a point midway between the two ionization chambers (corresponding to point 19 of Fig. 4) is at ground potential. The adjustment to bring this point to ground potential is made by moving the potentiometer slider 21. Having made this adjustment we then have again a series circuit analogous to that of Fig. 4. (It should be noted in this connection that if point 19 is not at the potential which the floating grid normally assumes, ground potential or any desired base potential, the current through chamber 15 is not necessarily equal to the current through chamber 16 in Fig. 5.) Since the potentiometer 20 with the voltage $E_2$ applied to it is really a simple means of applying a variable potential to chamber 16, we need not consider this part of the circuit. We may take, therefore, the voltage $E_{22}$ read by the voltmeter 22 as one of the potentials in the series circuit under consideration. Accordingly, when point 19 has been brought to ground potential by adjusting position of slider 21, we have:

$$E_{22} = IR_{16}$$

or $$I = \frac{E_{22}}{R_{16}}$$

Hence the magnitude of the current through chamber 15 (which is the same as the current through 16), can be calculated from the value of $E_{22}$ and the value of $R_{16}$.

Part 16 of the circuit may be a resistance which obeys Ohm's law. In this case the resistance would be independent of the voltage applied to it (neglecting temperature changes). Or it may be an ionization chamber with a fixed amount of radioactive material in it to produce a certain degree of ionization. Or it may be a photoelectric cell exposed to a certain intensity of light. In any case, if 16 is such a device that a finite electric current flows through it when a certain voltage is applied to it, it may be considered to be an electric resistance and the above equations apply to the circuit under equilibrium conditions.

It should be borne in mind, however, that ionization chambers (including photoelectric cells) as may be used in the circuit of the present invention, have peculiar properties which find no counterpart in the usual electric resistances. For this reason it is preferred to express the operation of the devices disclosed in these specifications, in terms of current rather than voltage.

On the other hand, if the two ionization chambers are not identical, or if the ionizing radiations are not the same the two ionization currents do not neutralize each other and the wire 19 will be at some other potential than the ground. In this case the current indicated by the device 9 will change when the switch 8 is closed after the wire 19 has been connected to the grid 2. It is evident that if the ionization current of one chamber is varied it can be adjusted so as to exactly compensate the current produced by the other chamber and this compensation or neutralization can be determined by the behavior of the vacuum tube when the grid of the same is connected alternately to the wire 19 and to ground. In other words, when the two ionization currents exactly balance, contact between wire 19 and the grid 2 does not change the anode current of the vacuum tube.

As an example of one simple way of controlling the ionization current in one of the chambers, as shown in Fig. 5, the chamber 16 is connected to a source of positive potential $E_2$ through the adjustable potentiometer device 20, whose only function is to provide an easily adjustable voltage range in value from zero to that of battery $E^2$, while the chamber 15 is connected to a negative source of potential $E_1$ of the desired value. For the purpose of explanation it will be assumed that the chamber 15 is the "measuring chamber" and the chamber 16 is the "compensating chamber". While the drawings show a battery and a potentiometer resistance for varying the potential on the chamber 16, it will be understood that any other well known manner of providing an adjustable potential may be employed. For example, the source of potential $E_2$ itself may be adjustable, in which event no potentiometer resistance 20 is required. The sole function of the resistance 20, therefore, is to provide a readily adjustable means for varying the potential on the electrode of the chamber 16.

It should be noted that chamber 16 together with the available source of ionizing radiations, should be capable of producing a current of the same magnitude as that which may pass through chamber 15, with a voltage applied to said chamber 16 considerably less than the voltage which would be required to produce saturation current through said chamber 16. Otherwise increase of the voltage indicated on meter 22 will not cause appreciable increase in current through chamber 16. Any well known manner of ionizing the gas in chamber 16 may be utilized. However, it has been found that one practical and very stable method of ionizing the gas is to use radium as the source of radiations which, as is well known, remains substantially constant over relatively long periods of time. If the chamber 16 is properly constructed a given voltage applied to it produces a definite ionization current and by suitable calibration the relation between the voltage and current can be obtained for the whole working range of the chamber.

If the measuring chamber 15 is exposed to a source of radiation, such as radium, the ionization current produced in said chamber can be measured by balancing the circuits so that the current passing through the compensating chamber 16 is equal to said current. The actual procedure using the system of Fig. 5 would then be as follows: The circuit of the vacuum tube is first adjusted so that the plate current, as indicated by the device 9, does not change when the grounding switch 8 is closed, it being assumed that no voltage is applied to the chamber 16.

Chamber 15 is then exposed to the ionizing radiations. With key 8 closed, there will be no change in the anode current of the vacuum tube, since the grid is directly connected to ground. At this time slider 21 of the potentiometer 20 is at its extreme left position, which means that no voltage is applied to chamber 16 and no current passes through said chamber. As soon as key 8 is opened, however, point 19 and the grid 2 are no longer grounded and they may assume any potential with respect to ground, consistent with the constants of the circuit. For the sake of simplicity we may assume that there is no grid leakage and no insulation leakage in the circuit. Then with slider 21 still at its zero voltage position we have chambers 15 and 16 in series with the battery $E_1$. Since chamber 16 is permanently ionized (containing radium), a current will pass through it to satisfy the equation $$E_1 - IR_{15} - IR_{16} = 0$$

$R_{15}$ and $R_{16}$ being, respectively, the equivalent resistances of chambers 15 and 16. Since slider 21 at this time is connected to ground, the electrode at the right of chamber 16 is maintained at ground potential. Hence the other electrode, and consequently wire 19, must be at a potential differing from ground potential by the amount $IR_{16}$. The grid 2, being connected to wire 19, will also be at a different potential from ground, and therefore the anode current indicated by 9 will be different.

Under the above stated conditions the same current passes through both chambers 15 and 16. Hence if we can determine the magnitude of the current through 16 we know the magnitude of the current through 15. As previously stated, chamber 16 may be calibrated so that knowing the voltage applied to it (or the IR drop across it), we know the current passing through it. Therefore, it is necessary to determine the voltage which is acting on chamber 16 when the same current passes through 15 and 16. This can be done in several ways. (For instance, the base potential of the anode-cathode system may be varied by means of slider 12 until the meter 9 reads the same as before. It can be shown that under these conditions the IR drop across 16 is equal to the potential difference of slider 12 between its initial position and the position for which 9 gives the same reading as before. This can be measured with an ordinary voltmeter. This method in general is not very practical and need not be explained in detail here.) The preferred method is as follows: Slider 21 is moved to the right thus adding a voltage $E_{22}$, as read by voltmeter 22, to the voltage $E_1$, acting on the two chambers 15 and 16. The slider 21 is moved until meter 9 reads the same anode current whether key 8 is open or closed. This indicates that wire 19 is now at ground potential. The current through 15 and 16 is the same. The value of $E_1$ was originally chosen to give saturation current in chamber 15 and no additional voltage influences the magnitude of this current. Hence $$I = \frac{E_{22}}{R_{16}}$$

as previously shown, and its magnitude may be determined from the calibration curve of compensating chamber 16. While the calibration curve for the compensating chamber has been referred to, it is to be understood that such a curve would properly express the relation between the voltage applied to the chamber 16 and the current produced therein or, indirectly, such calibration curve may represent the relation between the voltage applied to chamber 16 and the ionizing radiation applied to chamber 15. Any suitable units may be used for this calibration curve.

In this connection it may be stated that it is possible to construct the compensating chamber 16 in such a way that the voltage and current relation is a linear one over a comparatively wide range. Under such circumstances it is necessary only to calibrate the chamber for one value of applied voltage within this range. If half such voltage is applied the current will also be half of its previous value. This, of course, is a very desirable feature of such a device. To achieve this linear relation it is necessary that the source of radiation in the compensating chamber 16 produces a much more intense ionization than the ionization produced in the measuring chamber 15 under the conditions in which the latter is to be used. Under these circumstances the voltage required to produce a current large enough to equal even the largest current in the chamber 15 is low in comparison to the saturation voltage and, therefore, the chamber 16 acts substantially as a pure resistance and obeys Ohm's law over a very wide range.

Fig. 5a shows schematically the circuit arrangements for applying the invention to the measurement of photo-electric currents. In this figure the numeral 15ᵃ represents a photo-electric cell which may be energized from a suitable light source either of constant intensity which is to be measured or of a variable intensity which is to be measured. In the well known manner the shining of the light on the cell 15ᵃ produces small currents and the cell is provided with a battery E' corresponding to the battery E' of the preceding figures. The negative terminal of the battery E' is connected to one of the electrodes of the photo-electric cell and the other electrode of the cell is connected to the grid 2ᵃ of a floating grid electron discharge device provided with circuit arrangements similar to those disclosed in Figs. 1, 2 and 5. A compensating chamber 16ᵃ is also connected to the grid 2ᵃ and the right hand electrode of the compensating chamber is connected to a source of positive potential E². The method of adjusting the floating grid electron discharge device to bring the grid 2ᵃ thereof to ground potential is substantially the same as that described in connection with Fig. 5, and further description thereof is not believed to be necessary at this point.

It will be noted that in Fig. 5a corresponding parts to those shown in Fig. 5 are designated by the same numerals.

Fig. 5b shows how the invention may be applied to the measurement of thermo-electric currents. Similar numerals in this figure are used for corresponding parts to those shown in Fig. 5, and the method of measuring the magnitude of the thermo-electric currents is substantially the same as that already described in connection with Fig. 5. It will be noted however that in Figs. 5a and 5b the meter device 22ᵃ and 22ᵇ will be calibrated in units of photo-electric current and thermo-electric current respectively, and in addition if desired, these meters may carry the calibration scales for the compensating chambers 16ᵃ and 16ᵇ respectively.

In order that the calibration of the chamber 16 shall remain substantially constant for long periods certain precautions must be taken. Thus, the ionization may vary with atmospheric pressure and temperature if the chamber is open to the atmosphere. This can be avoided by making the chambers airtight. In addition, if there is leakage over or through the insulators for the lead-in wires this may change with atmospheric conditions and aging. This latter difficulty can be avoided almost entirely by the use of the well known "guard ring" principle. An example of a compensating chamber which meets all these requirements is shown in Fig. 6.

Referring particularly to Fig. 6, the ionization chamber comprises an envelope 23, of glass or other suitable material of cylindrical shape for convenience of construction. One electrode 24 is provided in the form of a coating of silver on the inside wall of the envelope 23, said coating being covered with any suitable radium salt as indicated by numeral 31. The lead-in wire 25 contacts with this silver coating in the usual manner. The other electrode 26 is in the form of a stretched wire extending along the axis of the cylinder. The wire 26 is mounted on opposite ends in amber insulators 27 and 28, which in turn are supported by brass bushings 29 and 30 of the shape shown. The brass bushings are hermetically sealed to the glass in any well known manner but preferably by means of DeKhotinsky cement which it has been found makes a gastight seal. The amber insulators and the wire 26 pass to the exterior of the chamber and are also sealed preferably with said cement. The chamber consists essentially of two coaxial cylindrical electrodes enclosed in a gas tight envelope which contains a radioactive material. The inner electrode 26 is not only highly insulated from the outer one but is also electrically separated from the latter by grounded metallic barriers (guard rings) 29 and 30. The inner electrode shown as a wire in Fig. 6, is brought out to the exterior by a suitable terminal through the amber bushing 28. The outer cylindrical electrode has an outside terminal 25.

It will be noted that if a voltage is applied to electrode 24 no current can flow to electrode 26 except through the air or other gas within the chamber. There can be no leakage between the electrodes because there is no continuous path over the glass and amber when the two brass bushings are grounded as shown. With this arrangement any leakage current is carried to ground before it reaches the amber insulators. The electrode 26 is connected to the grid 2 of the vacuum tube of Fig. 2 which has been brought to ground potential by the balancing method hereinabove described. Consequently at this time there is no difference of potential across the insulators 27 and 28. Before the desired balance is obtained the difference of potential across said insulators is small and the insulation of electrode 26 is almost perfect.

In order to pass current between the electrodes it is necessary to ionize the air or other gas within the chamber. The magnitude of the maximum current will depend upon the intensity of ionization and, depending on the limits of the currents to be compensated, the maximum available ionization should be adjusted accordingly. In other words, the strength of the source of radiation which is to ionize the air within the chamber is determined by the magnitude of the current which is to be measured. For practical purposes in the measurement of X-rays, photo-electric currents, or other energy forms of low magnitude, a small amount of radium is sufficient. Radium is ideal for this purpose because of the intense radiation which it emits and because of its relatively long life. In order that the full benefit of the three types of radium radiations may be obtained the radium should be introduced into the chamber in the freely emanating state. This may be accomplished by dissolving radium chloride in water containing a small amount of glycerine, pouring the solution into the chamber and evaporating the water so that a film of glycerine and radium salt is left on the inner surface of the chamber. Following this procedure and sealing the chamber airtight the activity of the radium increases for about one month, according to well known laws, and then remains substantially constant for a long time. Since the ionization within the chamber depends not only on the intensity of radiation but on the pressure of the air or gas, it is desirable that the original pressure remain constant. With radium salt introduced, as described above, this is not completely attainable because the radiations disintegrate the glycerine and traces of water left behind producing gases. The pressure therefore increases, although very slowly. If it is desired to have a chamber which need not be calibrated for a period of many years it is necessary to avoid the presence of organic materials and water within the chamber. This may be done by using quartz as an insulator in place of the amber bushings and introducing the radium salt dry or in a sealed container. For most practical purposes, however, these latter refinements are not absolutely necessary.

A chamber made as described in conjunction with Fig. 6 and containing a fraction of a milligram of radium shows a direct proportionality between voltage applied and resultant ionization current for a considerable range. Accordingly if such a chamber is once calibrated the value of ionization current may be ascertained by reading the voltage applied to the chamber. In fact, the voltmeter itself may be provided with a scale calibrated directly in units of current, preferably electro-static units, since the ionization currents produced are of low magnitude. While there are many standard procedures for measuring small currents which can be used for calibrating the ionization chamber this calibration can be attained in a relatively simple manner by using the vacuum tube circuit described in connection with Figs. 2 and 5. Because the current is very small its magnitude is best determined by indirect means.

Referring to Fig. 7, there is shown a suitable scheme for producing the calibrating current. As shown in this figure the numeral 32 represents schematically the arrangement of vacuum tube circuits disclosed in Fig. 2. The grid 2 of the vacuum tube is connected to the electrode 33 of the ionization chamber 34 to be calibrated. Grid 2 is also connected to ground through the switch 8 for purposes hereinabove described and, likewise, said grid is connected through a variable condenser 35 which is adapted to be charged by a suitable battery 36 or other source of potential. It is desirable that the plates of condenser 35 be highly insulated and provided with guard rings in the well known manner in order to prevent leakage currents flowing through the condenser to the electrode 33. It is well known that when a voltage is applied to a condenser there is a transient current flowing in the circuit during the time required for the condenser to become fully charged. Similarly, when the voltage across the condenser is changed from one value to another, there is also a transient current in the circuit which persists so long as the value of the potential difference is being varied. It is for the same reason that an alternating voltage applied to a condenser sets up an alternating current in the circuit. In an analogous way a current may be made to flow in a circuit which includes a charged condenser by varying the capacity of said condenser. The current will flow only during the time that the capacity is being varied. If the capacity is varied at a constant rate, the magnitude of the current is constant during the interval. In any case, if the voltage across the condenser is maintained at a constant value E and the capacity is changed from an initial value $C_1$ to a final value $C_2$ in an interval of time T, then the average value of the current induced in the circuit is given by the equation $$i = E\frac{(C_1 - C_2)}{T}$$

Accordingly, we have a means of producing a small direct current (by varying the capacity at a constant rate), whose magnitude can be determined by measurements of voltage, capacity and time, which can be easily made.

The operation of the device of Fig. 7 is briefly as follows: With a certain voltage applied to chamber 34 (which is assumed to contain radium) and key 8 closed, a current of a certain magnitude flows through 34. Similar, with a certain voltage 36 applied to condenser 35 and a certain rate of change of the capacity of 35, a current of a certain magnitude is induced in the local circuit which is connected to ground through key 8. The manual operation consists in varying the capacity of condenser 35 at such a rate that the induced current is equal to the ionization current in both magnitude and direction. By analogy with the circuit of Fig. 5, when such is the case the anode current is the same whether key 8 be open or closed. With key 8 open the anode current serves to indicate whether the proper equilibrium conditions are maintained during the time that the capacity of condenser 35 is being changed. The value of the induced current, which under these conditions is the same as the ionization current, may be calculated from the relation $$i = E\frac{dc}{dt} = \frac{E_{36}(C_1 - C_2)}{T}$$

inasmuch as the time rate of change of capacity $$\left(\frac{dc}{dt}\right)$$

was kept constant during the entire change. Accordingly, the magnitude of the current can be determined by measuring the voltage 36 applied to the condenser, the change in capacity $C_1-C_2$ and the time T. In practice the capacity is changed at such a rate as to maintain the circuit properly balanced during the interval in which the capacity is changed. This balance is determined, as described hereinabove, by observing the anode current of the device 32. The variable condenser 35 is, therefore, adjusted rapidly or slowly so as to maintain the anode current constant. This, of course, determines the time required to vary the movable plates of the condenser from one limit to the other. As a matter of fact, other conditions being equal, this time is inversely proportional to the magnitude of the ionization current. For relative measurement, therefore, it is not necessary to know the values of any other factors. To obtain the absolute value of the current it is merely necessary to measure the voltage applied to the condenser, the change in the capacity, and the time during which the change takes place. The value of the current can then be determined from the formula given above. It will be seen that this latter method can be used to measure any small unidirectional current. The method, however, is not very convenient in practice because it requires very careful manipulation of a variable condenser. It should be remembered in this connection that the measurement of very small currents in absolute units is always a difficult problem. The method of measurement described above in which a "compensating ionization chamber" is employed, is eminently practical and convenient, provided the compensating ionization chamber has been first calibrated in absolute units. In making this calibration it is necessary to measure very small unidirectional currents in absolute units. One indirect but practical method of doing this is by the use of the variable condenser as just described. Hence, for greater accuracy it is desirable to incorporate the variable condenser in the system, so that the compensating ionization chamber may be calibrated in absolute units in the first place and the constancy of its calibration may be checked from time to time.

Fig. 7 shows the circuit connections for the calibration of the "compensating ionization chamber" 34 by means of the variable condenser method. The procedure is as follows: A certain voltage is applied to chamber 34 and the value of this potential is read by the voltmeter 22. With key 8 closed a certain current of definite value (depending on the construction of the chamber 34 and the amount of radium in it), flows through chamber 34 to ground through key 8. Under these conditions $E_{22} - IR_{34} = 0$ as usual, I being the current through chamber 34 and $R_{33}$ its equivalent resistance. By analogy with the circuit of Fig. 5, in order to balance the system when key 8 is opened, it is necessary that the same current $I$ flow through the condenser 35 and battery 36 to ground. Since a direct current cannot flow through a condenser it is evident that an additional manipulation is required. The passage of current through condenser 35 may be brought about by electrostatic induction by varying its capacity. By analogy with the circuit of Fig. 5, when the system is properly balanced, the point of the circuit which is connected to the grid of the vacuum tube must be at ground potential with key 8 open. Hence the only voltage which can act on condenser 35 under these conditions is that of battery 36, say $E_{36}$. Therefore, the current $I$ which must be made to pass through condenser 35 by induction, is related to voltage $E_{36}$ by the expression $$I = E_{36}\frac{dc}{dt}$$

Hence the capacity of condenser 35 must be varied at a certain definite time rate in order to let current $I$ pass through and maintain the system balanced. That is, the capacity of condenser 35 must either increase or decrease (depending on the polarity of battery 36) at the rate of say one micromicrofarad per second. It is evident that with any given variable condenser one cannot increase (or decrease) the capacity indefinitely and therefore the system can be kept balanced only for a limited time, while the capacity is changed say from 50 to 75 micromicrofarads. The actual manipulation is as follows: Key is opened, a stop watch is started and rotation of the movable plates of condenser 35 (assuming a variable condenser of the usual type) is initiated at the same time. The speed of rotation of the condenser plates is regulated so as to maintain the grid of the vacuum tube system at ground potential by watching the meter in the anode circuit. Under these conditions the system is properly balanced and the induction current through the condenser is equal to the ionization current through the ionization chamber 34. When the movable plates of the condenser 35 have reached the opposite extreme position from the one they occupied initially, the stop watch is stopped immediately and key 8 is closed. We now have, for example, the following readings: $E_{36} = 10$ volts; change of capacity from 50 to 75 micromicrofarads, that is, $25 \times 10^{-12}$ farads; time during which system was kept balanced, 25 seconds. Therefore $$I = \frac{E_{36}(C_1 - C_2)}{T} = \frac{10 \times 25 \times 10^{-12}}{25} = 10^{-12} \text{ ampere}$$

By repeating the same process with different values of the voltage $E_{22}$ applied to ionization chamber 34, it is possible to obtain a calibration curve for said chamber 34 so that it can be used later as a compensating ionization chamber in a circuit such as shown in Fig. 5. In the method disclosed in Fig. 7 the balance of the system obtained by varying the condenser capacity, is effected for a limited time during which manual operation of the condenser 35 is necessary, and, in addition, a suitable timing device, such as a stop watch or the like, must be employed. By employing an electric timer and providing suitable contacts on the condenser the operation can be simplified. Nevertheless the compensating chamber method of Figs. 4 and 5 is to be preferred to that of Fig. 7 for practical work since it is simpler, the readings can be taken more rapidly, and the compensation is permanent. This is of particular importance where the current to be measured is subject to irregular fluctuations, in which case an average value can be obtained without the necessity of taking many readings.

However, the permanent compensation advantages of the compensating chamber method may be obtained by means of the arrangement disclosed in Fig. 8. There is shown in this figure a drum 37 having four metallic quadrants 38, 39, 40 and 41, said quadrants being electrically insulated from one another and preferably supported on an amber base. The quadrants are adapted to be rotated at a definite angular speed and for this purpose they are insulatingly mounted on a shaft 42 which is driven at the required rate from any suitable motive source. Diametrically disposed brushes 43 and 44 are provided for contacting with the respective segments as the drum rotates. Brush 43 is connected to the slider arm 45 of a potentiometer device 46, while the brush 44 is connected to the electrode 47 of the measuring chamber 48, said brush 44 being also connected to the "floating grid" 2 of the electron discharge device 49, as described hereinabove. As the quadrants 38, 39, etc., rotate in the direction of the arrow each is successively brought to the potential indicated by the voltmeter 50 when the brush 43 makes contact therewith.

As each quadrant leaves brush 43 it remains charged since, as already stated, the quadrants are highly insulated from one another and from the rotating shaft. With the grounding key closed, however, each quadrant is discharged to ground as soon as it touches brush 44. Under these conditions the operation of the device consists simply in carrying charges of electricity from brush 43 to brush 44 and thence to ground. It is analogous to a bucket wheel used to transfer water from a well to an open conduit. Each bucket is filled when it comes under 43 and emptied when it gets to 44. An intermittent flow of water may thus be set up in the conduit. Similarly, an intermittent but unidirectional current of electricity is set up in the wire which connects brush 44 to ground through the grounding key. The intermittent current, of course, is equivalent to a steady or direct current of a certain magnitude (in which case on the average the same number of electrons pass through a given cross-section of the wire in a given time).

The magnitude of such a current may be varied by varying: (1) the size (capacity) of the quadrants, (2) the rotational speed, and (3) the charging voltage at brush 43. (The last named method is the simplest one.) We have here a device which produces a very small current whose magnitude may be changed at will and which, therefore, can be used in place of the compensating ionization chamber in the circuit of Fig. 5. (The insulated rotating quadrants and brushes take the place of the ionization chamber 16 with radium in it.)

The operation of the device of Fig. 8 becomes very simple in terms of a water analogy. The battery to which chamber 47 is attached may be thought of as the water reservoir and chamber 47 as the valve. When a beam of X-rays shines on 47 a stream of water passes through the valve and flows into a tank which already contains water to a certain level indicated by a gauge in the form of the vacuum tube circuit 49. The water level in the tank starts to rise; but we set in motion a bucket wheel arrangement whereby the buckets are filled with water when they dip into the tank and are turned over to spill the water outside of the tank as they come out. This tends to lower the level of the water in the tank. By proper adjustment of the speed of the bucket wheel it is obvious that a condition of average balance may be obtained such that the level of the water in the tank remains substantially constant. When this balance has been obtained, just as much water flows (at a constant rate) into the tank as is removed (intermittently) by the buckets. Then, in order to determine the rate of flow of water into the tank, it is only necessary to know the amount of water which each bucket discharges and the number of buckets discharged per unit time.

While in the foregoing the indicating or measuring device 9 is shown in the anode circuit of the "floating grid" device it will be understood that this indicator can be connected in the output circuit of a plural stage amplifier. When more than one stage of amplification is required it is preferred to employ an amplifying system of the type disclosed in Fig. 9. As shown in this figure the amplifier is preferably of the so-called direct current type in which the successive stages are "coupled" by means of high resistances 51, 52 and the grids 53, 54 of the respective stages are directly connected to the coupling resistances. The coupling resistances 51, 52 are preferably of high value and adjusted to give maximum amplification and stability during operation.

The parts of this figure which are similar to those already described in connection with Figs. 1 to 8 bear the same designation characters, and the remaining parts of the amplifier, per se, are well known in the art and further description thereof is not believed necessary at this point except to mention that the device 9 connected in the output circuit of the last amplifier stage may be a milliammeter, or other equivalent indicator, or even a recording instrument which, as described hereinabove, may be calibrated in the desired units.

For many reasons it is desirable to have the apparatus disclosed in Figs. 1 to 8 entirely automatic or self-compensating so that no manual operations are required in taking a reading. Also it is desirable to have a permanent record. As a matter of fact, while the apparatus is described hereinbefore as a measuring system, it will be obvious to those familiar with the art that the energy variations to be measured may take the form of light variations, and resistance variations such as are encountered in picture transmission, television, telegraph, or other similar systems, and it is to be understood therefore that in the following description where the term "recorder" is employed it is intended to mean any device for producing a visible record or translation of original energy values.

Referring to Fig. 10, there is shown one form of automatic compensating and recording mechanism according to the invention. The numeral 55 represents generally a motor of which the magnetic circuit 56 is of sufficient cross section to enable the motor to be operated so that the magnetization of the iron in the magnetic circuit is maintained on the straight portion of its magnetization curve under the normal running conditions of the motor. An auxiliary field winding 57 is provided, together with an adjustable source of current represented by the numeral 58, for independently adjusting the magnetic field of the motor to any desired value either by aiding or opposing the field produced by the main field winding 59. A source of potential 60 is applied to the motor armature 61 and this potential may be adjusted in accordance with the desired speed of the motor, but once adjusted said speed should remain constant throughout the recording and compensating operations. Under these conditions any change in the current through the field winding 59 causes a change in the motor speed, the circuits 57, 59 being preferably arranged so that a decrease in the main field winding produces an increase in motor speed. The field winding 59 is connected in the output circuit of the last amplifier stage, represented by the numeral 62, this stage corresponding to that of the amplifier illustrated in Fig. 9. Similarly the measuring chamber 15 and the compensating chamber 16 are connected to the grid 2 of the floating grid amplifier already described in connection with Fig. 5.

The electrode 63 of the compensating chamber 16 is connected by means of conductor 64 to a traveling nut 65 which is adapted to move towards the right or towards the left in accordance with the rotation of the threaded shaft 66. Nut 65 carries on one side a contact 67 adapted to make contact with the potentiometer resistance 68 across which is connected a battery or other potential source 69. A voltmeter 70 is also provided for indicating the instantaneous voltage applied to electrode 63. Nut 65 also carries a suitable recording pen 71 which co-operates with a traveling chart 72, this chart being preferably of strip form and adapted to be fed to the recording point in any well known manner to make a permanent and running record of the varying positions of the contact 67.

For the purpose of reciprocating the contact carrier 65 shaft 66 is provided with a gear 73 which meshes with a corresponding gear 74 affixed to shaft 75. Shaft 75 is adapted to be rotated either in a clockwise direction or a counter-clockwise direction under control of respective motors 76 and 77. A source of potential 78 is connected to the armatures of both motors 76 and 77, said armatures also being connected to the respective contacts 79 and 80 between which is positioned a movable armature 81. When armature 81 is in its neutral position, as shown in Fig. 10, the circuits through both motors 76 and 77 are broken and consequently the nut 65 remains stationary.

The circuits are so arranged that when lever 81 closes with contact 79 the motor 77 rotates the shaft 75 in one direction and when lever 81 closes with contact 80 motor 76 rotates shaft 75 in the opposite direction. Instead of providing two motors for this purpose it will be obvious that a single motor may be employed and any equivalent type of reversing mechanism likewise employed. For the purpose of operating the lever 81 the motor shaft 82 is provided to which is attached a centrifugal ball governor 83. The free end 84 of the governor is provided with a projection 85 which registers with the forked end 86 of the lever 81, said lever being pivoted at the point 87. It is clear, therefore, that as the motor increases or decreases from its selected normal speed the level 81 will be moved either towards the right or towards the left. The complete operation of the mechanism disclosed in Fig. 10 is as follows. The measuring chamber 15 is subjected to radiation after the adjustments already described in connection with Figs. 2 and 5 are made to make sure that the grid 2 of the first tube is at ground potential. Under these conditions the current in the output circuit of the last tube 62 assumes a certain value which depends on the adjustments of the amplifier stages which obviously may be varied in any desired manner. Inasmuch as the amplifying equipment will vary but slightly from day to day it is preferable not to make any adjustments in the amplifying stages unless changing conditions require such adjustments.

The motor 55 is next connected in circuit and it will operate at a speed determined by the strength of currents in the field windings 57 and 59 and the voltage applied to the armature 61. The motor speed can be adjusted either by changing the current through winding 57 or by changing the voltage applied to the armature 61. This adjustment can, therefore, be made independently of the current in the output circuit of the tube 62. Such adjustments having been made the motor will run at its normal speed in which the lever 81 floats between contacts 79 and 80 without making contact with the latter.

Assuming that the current to be measured is produced in the chamber 15 of such polarity that the plate current in the tube 62 will increase and the motor speed will, therefore, decrease. Consequently the end 84 of the governor will move towards the right and operate the lever 81 to close with contact 80. The motor 76 thereupon operates and rotates a shaft 66 in a clockwise direction whereby the contact 67 is moved toward the left from its zero position. As contact 67 thus moves an increasing voltage is applied to the compensating chamber 16 until the current through the latter chamber just balances the unknown current from the chamber 15. This state of conditions is represented in Fig. 10 by the full line position of member 65 and associated elements 67 and 71. It will be understood, of course, that instead of using an ionization chamber 15 any small current, such as a photo-electric current, may be connected to the grid 2 for measurement. When the above described automatic balance of currents from the chambers 15 and 16 has been accomplished the plate current in the tube 62 is brought back to its initial value and consequently motor 55 again runs at its normal speed and accordingly contact 80 is broken and the potentiometer slider 67 is brought to rest.

By means of the voltmeter 70 the observer can ascertain the value of the current from the source 68 by means of a suitable calibration curve or, if desired, the voltmeter itself may be calibrated directly in units of current, or in any other units, depending on what energy form is being measured, for example ordinary light, ultra violet light, X-rays, radium radiations, etc.

It should be noted that the length of lever 81 and the air gaps between lever 81 and contacts 79 and 80 determine the fineness of voltage adjustment necessary. In other words, contact is broken at 80 before the exact balance is obtained. By making lever 81 long and the contact gaps small the difference in time between the attainment of a balance and the breaking of a contact may be made as small as desired. Exact compensation may also be obtained by proper adjustments since the inertia of the rotating parts will tend to carry the member 65 slightly beyond the position at which contact should be broken by lever 81. The amount of this "over shooting" action may be controlled by suitable electro-magnetic breaks (not shown) proportioned according to the rotating masses and the friction of the mechanism. As soon as the current through chamber 15 ceases the potentiometer slider 67 is brought back to its normal position since the plate current in the tube 62 decreases and motor 55 speeds up causing lever 81 to contact with 79. Motor 77 is thereupon operated to drive the member 65 back to its normal position.

It is evident that a permanent record of the reading may be made by simply using a recording voltmeter in place of or in parallel with the voltmeter 70. However, a continuous record may be made in a relatively simple manner by means of the member 71 which is also attached to the member 65 as herein above described. It should be noted in this latter connection, however, that the motion of the recording member 71 on the chart 72 is not directly proportional to the voltage applied to chamber 16 unless the current drawn by the voltmeter is very small in comparison with the current passing through the potentiometer. Since it is objectional in practice to have a large current passing through the potentiometer 68 when a small one will serve the same purpose it is preferable either to graduate the record receiving surface 72 with uneven divisions properly calibrated, or to wind the potentiometer 68 with gradually increasing spaces between adjacent portions, the design of the spacing being determined by experiments. In this latter case a final adjustment can be made by varying the voltmeter resistance.

A simpler mechanism for automatically changing the position of the potentiometer slider is shown in Fig. 11. In this figure the motor shaft 82 is used directly to drive the screw shaft 66 in the proper direction depending upon the position of the governor 83. A pulley 88 is attached to the free end 84 of the governor and is loosely keyed to the motor shaft 82. A pulley 89 is fastened directly to the shaft 66 while another pulley 90 is geared to shaft 66 by a gear train 91 for driving the shaft 66 in a reverse direction.

The members 88, 89 and 90 may be made out of wood, fibre, or of any other surface for providing the necessary frictional coupling therebetween. It will be seen, therefore, that when the motor shaft 82 slows down pulley 88 will drive the shaft 66 in a clockwise direction, for example, whereby the slider 67 is moved towards the left. On the other hand, when the motor speeds up pulley 88 drives pulley 89 and reverses the direction of movement of slider 67.

Referring to Fig. 12, there is illustrated another manner of controlling the potentiometer slider of Fig. 10. In Fig. 12 the numeral 62 corresponds to the last amplifier stage as shown in Figs. 9 and 10. In this embodiment the output current of the amplifier operates a galvanometer type relay preferably employing a permanent magnet for the field. The main moving coil 92 is connected in the output circuit of the amplifier, as shown, and an additional differential winding 93 is provided in the moving coil system to balance out the plate current from tube 62 when the latter is at its normal value. Attached to the moving system in any convenient manner is a pointer or lever 94 which is placed between the contacts 95 and 96. One suitable type of galvanometer adapted for this purpose is that known as the Weston model 30 instrument. Because of the high sensitivity of this differential type relay very slight variations in the plate current of tube 62 will turn the lever 94 through relatively large angles. Since contacts 95 and 96 can be close together a very small variation in plate current will result in contact being made either at 95 or 96.

In the embodiment of Fig. 12 the potentiometer screw 66 is adapted to be driven by motors 97 and 98, corresponding to the motors 76 and 77 of Fig. 10. Electromagnetic switches 99 and 100 are provided for closing the circuit of the associated motors. The electro-magnetic switches are in turn actuated by associated vacuum tubes 101 and 102 connected, as shown in the drawings. The grid 103 of tube 101 is connected to contact 95, while the grid 104 of tube 102 is connected to contact 96, both of these latter contacts being well insulated from ground. Under these conditions (or with a suitable grid bias on grids 103 and 104) the plate current of each tube is insufficient to operate the associated electro-magnetic switch. However, when either grid is grounded (or made strongly positive, if desired) by lever 94 closing with either contact 95 or 96 the increased plate current will close the associated switch and the proper motor will be started. The motor will stop when the lever 94 leaves the contact 95 or 96, which happens when the plate current in the tube 62 returns to its normal value. With this arrangement it will be noted that the sensitive lever 94 is required to break only the relatively small grid currents for the tubes 101 and 102 and that a correspondingly large plate current can be used to operate the electro-magnetic switches.

For some purposes it is desirable to have an integrating device which reads or records the product of the current and the time it has acted. This is particularly important when considerable fluctuations in the value of the current are apt to occur during the desired length of time. The addition of an integrating voltmeter in parallel with the voltmenter 70 (Fig. 10) will accomplish thus purpose or, if desired, a watt hour meter will serve the same purpose by providing either an auxiliary current or an auxiliary voltage of constant magnitude. The integrating instrument can be calibrated in any desired units. Thus when the instrument is used to measure quantity of X-radiation the calibration can be made in "r" units according to the recently internationally adopted definition of this latter unit.

Referring to Fig. 13, there is shown a novel form of ionization chamber for measuring the intensity of X-rays or other forms of energy radiation capable of producing ionization currents. In connection with the definition of the international unit of X-radiation called the "r" or Roentgen, the ionization chamber must fulfill certain requirements (see the paper by Gioacchino Failla "Criteria for the Design of a Standard Ionization Chamber" read in Stockholm July 1928 at the Second International Congress of Radiology and "The Measurement of X-rays by Physical Means" read at the annual meeting of the Radiological Society December 1928). The ionization chamber of Fig. 13 meets in a practical manner substantially all of the requirements of the international definition.

In connection with the usual type of ionization chamber the most serious disadvantage is the size of the chamber itself and the large distance between the electrodes which necessitate the use of a high constant voltage in the range of two thousand to five thousand volts in order to obtain saturation currents with ordinary beams of X-rays. In these chambers as ordinarily constructed the beam of radiation passes through the center of the chamber and parallel to the electrodes. In the chamber shown in Fig. 13 the X-ray beam 105 enters the chamber 106 perpendicular to the electrodes 107, 108 and 109 and passes through the electrodes at their central portion. It is evident, therefore, that the electrodes 107, 108 and 109 must be made of a material which is practically transparent to X-rays. To fulfill this and other requirements the electrodes are made of thin specially prepared animal skins, such as are ordinarily used in drum-head constructions. They are made sufficiently conducting by painting them with India ink or a similar material.

X-rays ordinarily employed in practice are of sufficient penetrating power to suffer little absorption in going through the members 107, 108 and 109 and, therefore, this absorption can ordinarily be neglected. Furthermore, the secondary radiations which are produced in the membranes 107, 108 and 109 by the passage of the main beam 105 are not very different from the secondary rays produced by the air within the chamber 106. This is due to the fact that the chemical constituents of the membranes do not differ much in atomic weight from the constituents of air.

In any case, the chamber can be compared with a "standard" chamber using X-rays of different wave lengths and suitable corrections can be made. It is in fact possible to alter the effective chemical composition of the electrodes 107, 108, and 109 in such a way that readings taken with this chamber and those from a standard chamber are directly proportional over a wide range of wave lengths. For example, suppose that the intensity of a certain beam of X-rays is lower when measured by the drum-head construction of Fig. 13 than when measured by a standard chamber. A higher reading can be obtained with the chamber of Fig. 13 by adding some tin (or a chemical compound of tin) to the inner surface of the drum head on the emergent side of the beam. This will have the effect of absorbing more radiation before it leaves the volume in which the ionization is measured and increasing the ionization through the action of the secondary rays emitted by the tin. By using several materials of different atomic weights in the proper proportions good parallelism can be obtained between readings taken with the drum-head construction shown and a standard chamber over a wide range of wave lengths.

It should be noted that the ionization chamber proper is bounded by the outer drum-heads 107 and 109. The outer casing 106, preferably of lead lined brass is used to shield the chamber electrostatically and from stray radiations. The distance between the center electrode 108 and the outer electrodes 107 and 109 can be of any size as found desirable.

In practice two centimeters is a convenient distance and with this construction a potential of two hundred or three hundred volts is sufficient to produce saturation current with beams of ordinary intensities. The drum-heads are supported on an aluminum frame 110 with the outer electrodes 107 and 109 insulated from electrode 108 and from the casing 106. A guard ring 111 in the form of a brass sleeve is provided between the inner and outer electrodes. The inner electrode 108 is mounted on amber insulators 112 and the casing 106 is connected to ground. The opposite walls 113 and 114 of the casing are provided with respective openings 115 and 116 and an interchangeable shutter 117 is mounted on the casing in front of the aperture 115 to control the size of the beam. The outer electrodes 107 and 109 are connected to a convenient source of potential 118 through a lead-in wire 119 which is well insulated from the casing 106 by a bushing 120. Said outer electrodes are also insulated from the guard ring 111 by an insulating ring 121 mounted on the guard ring. The central electrode 108 is connected to the grid 2 (Figs. 2, 5, 9 and 10) by means of a well insulated conductor. One of the main advantages of the compensation device disclosed in Fig. 13 is that the length of this wire connecting to the floating grid (that is the capacity of the system) has no influence on the current reading. Also this insulation need not be extremely high as is the case when electroscopes are used for measuring small currents in the usual way. It has been found that when ordinary "high tension" wire, such as used in automobile ignition or the like is used no appreciable difference in readings is observable with connecting wires of a few feet and connecting wires of a hundred feet. This latter feature enables the instrument to be very conveniently used in certain locations. For example, the measuring device proper in Fig. 13 can be installed permanently in a convenient place and the ionization chamber alone is moved from one X-ray machine to another when measurements are made.

When an integrating or recording device is added to the measuring instrument it is desirable to have the ionization chamber permanently attached to the X-ray tube holder. Accordingly the casing 106 is made substantially flat so as not to interfere with the utilization of the beam.

It is important to note that X-ray machines as usually employed are of the so-called mechanical rectifier type and there is produced a violent sparking at the synchronous switch which is required to rectify voltages up to two hundred thousand volts. On this account all parts of the measuring instrument must be carefully shielded from electrostatic disturbances. It is not necessary to ground the shield in fact, grounding of the shield sometimes is undesirable. For this reason the cable joining the ionization chamber and the measuring device should be covered by a copper braid and this, in turn, should be enclosed in a rubber tube.

It is customary to determine the penetrating power of a beam of X-rays by measuring the rate of absorption of radiation in different thicknesses of a suitable material such as copper. In order to plot the results graphically with any degree of precision at least five or six different thicknesses of material should be used. Heretofore, on account of the dangers involved, it has been the general practice to shut down the power before entering the X-ray room, when the "filter" in front of the ionization chamber is to be changed. This involves a considerable loss of time and is apt to change conditions which influence the X-ray emission. To overcome this difficulty there is disclosed in Fig. 14 of the drawings a device whereby a plurality of filters may be selectively positioned in front of the measuring chamber without entering the X-ray room or stopping the X-ray machine.

Referring to Fig. 14 there is shown a circular disk 125 which is mounted on a shaft 126 and is provided near its periphery with a series of holes 127, the holes being of the proper size to let the required beam of rays pass through. The holes are provided with recesses into which filters of different thicknesses may be inserted. Once these thicknesses are determined the filters are left in place in the disk 125. The disk is so mounted that the filters therein may be brought into registry with the aperture 128 of the measuring chamber 129 which is preferably of the type disclosed in Fig. 13 described hereinabove. For the purpose of rotating disk 125 selectively to position the filters the shaft 126 carries a worm gear 130 which cooperates with a worm 131 attached to a shaft 132. The latter shaft carries at its right hand end a friction pulley 133. Rotary movement is transmitted to shaft 132 and disk 125 by means of an electric motor 134, the armature of which is provided with considerable "end play".

When the motor is at rest the armature and shaft 135 are held towards the left under tension of a spring 136 in which position the pulley 137 is out of engagement with pulley 133. As soon as current is applied to the motor the armature centers itself in the motor field and pulleys 133 and 137 are brought into contact, and disk 125 is slightly turned. As soon as the power is shut off spring 136 pulls the armature to one side and disengages the pulleys. The disk 125 is therefore stopped very quickly since it is preferably made of light material while the relatively heavy motor armature continues to rotate because of its inertia. In order accurately to stop the disk with the proper filter before the aperture 128 there is mounted on the shaft 126 a metal disk 138 which carries a series of insulating buttons 139, one for each of the filters in disk 125. A brush 140 is provided to make contact with the disk when one of the insulating buttons is not directly under it. From an examination of Fig. 14 it will be seen that once the motor is started it will keep running until an insulating button 139 comes under the brush at which time the power circuit is broken. The buttons are so mounted in the disk 130 that when the circuit is broken as described the selected filter is directly over the ionization chamber 129. To bring the next filter in place it is only necessary to close the switch 141 to restart the motor 134. Switch 141 is held closed until the insulating button moves out of registry with brush 140. The power is then automatically shut off as the next insulating button engages said brush. In this manner each of the filters may be brought into position over the measuring chamber.

While in the foregoing specific apparatus and arrangements are disclosed it will be understood that various changes may be made without departing from the spirit and scope of the invention. For example, the measuring and compensating instruments may be operated without having the grid 2 at ground potential. In this case the grounding key 8 is connected to a potentiometer which supplies a potential equal to the one which the grid 2 would assume when disconnected from everything else. Under these conditions there is no grid current and the key 8 may be closed or opened without changing the anode current. With this arrangement, however, it is necessary that everything connected to the grid 2 be carefully insulated to avoid leakage.

It is possible, however, to compensate for leakage, if present, irrespective of the grid potential. This can be effected by an additional ionization chamber which is used for this purpose only, or by noting the voltage required on the main compensating chamber to compensate the small leakage current. This value of the voltage is then subtracted from all subsequent readings.

When a very sensitive instrument is desired it is preferable to operate the first tube with a sufficiently low plate voltage to avoid ionization within the tube. For tubes in common use it has been found that the plate voltage in the order of 15 volts or less is suitable for this purpose.

While the apparatus disclosed is highly advantageous in the fields of X-ray measurements and kindred fields it should be noted that the instrument may be used for the measurement of small uni-directional currents of any character. Thus a photo-electric current may be balanced by an ionization current and vice versa, or in the case of sound measurement the sound waves may be caused to produce suitable potential variations. For example, by their action on a piezoelectric transmitter or similar device. Inasmuch as the ionization chamber with a radio active material in it and having a low voltage applied to it acts as an ohmic resistance of high value it is evident that any high resistance of proper value may be used to give the compensating current of the desired magnitude.

While batteries are shown in the drawings for providing the different voltages and currents they may be replaced by other sources of suitable constancy.

According to the uses to which the instrument is put it can be calibrated in the proper units. For example, in the case of an X-ray measuring instrument the voltmeter associated with the compensating chamber system may be graduated in "r" units per minute to express directly the intensity of the X-ray beam. If used to measure radium it may be calibrated in milligrams, etc. It should be noted that the instrument has the great advantage that the connection between the ionization chamber, photo-electric cell, thermopile, etc., and the vacuum tube system may be made as long as desired without changing the calibration of the instrument. This feature is of particular importance in the measurement of X-rays and radium because of injurious effects of these rays on anyone exposed to them for a sufficient length of time.

While in the foregoing specification the instrument has been described as used for measuring energy radiations it will be understood that it is capable of use in measuring any form of energy manifestations. For example, radio-active rays, ultra-violet rays, ordinary light rays and heat rays.

The invention also includes within its scope the use of the instrument for comparing light sources and their emission, to compare and measure high electrical resistances and capacities. Furthermore, the recording feature of the invention may be used in many different processes such as thermo-electric pyrometry, spectrum analysis, etc., and in any situation where small currents are involved.

In the foregoing specification the ionization currents mentioned have referred particularly to those produced in a gas by ionizing radiations or otherwise. Since the instrument of the present invention is capable of detecting and measuring any small unidirectional electric current irrespective of the origin of the current, it is obvious that other ionization currents can also be detected and measured. As such currents may be mentioned weak currents produced in an electrolyte or currents produced in a liquid dielectric by ionizing radiations and the like.

The meaning of the expression "floating grid" as used in this specification may be deduced from the following. In a vacuum tube of the audion type the control grid is in the path of an electron stream moving from the cathode to the anode. By the mere fact that it constitutes an obstacle to the passage of electrons, some electrons necessarily impinge on it. If these electrons cannot leave the grid through an external grid connection or otherwise, the potential of the grid will become more and more negative as more electrons strike it, until this potential reaches the value for which the force of repulsion acting on the electrons in the stream prevents the further accumulation of electrons by the grid. This assumes, of course, that the grid is perfectly insulated. In any actual tube, however, the supporting structure of the grid and other parts of the tube which come in contact with it are not perfect insulators and, therefore, some of the electrons which reach the grid are able to "leak" out. This leakage increases as the potential of the grid becomes more negative and it is evident that finally a condition of equilibrium will be attained when the number of electrons which reach the grid per unit time is equal to the number of electrons which leave it through leakage. It will be seen from this that the equilibrium potential of the grid of any given tube (e. g. with respect to the negative end of the cathode) depends on the structural characteristics of the tube and on those factors which influence the electron stream (e. g. filament or cathode current and plate voltage). A grid whose potential (with respect to the negative end of the cathode) is derived solely from its interaction with the electron stream may be said to be a "floating grid". In the arrangements described hereinbefore, the vacuum tube is used with a "floating grid" substantially as just explained and this is an essential feature to obtain the highest sensitivity. The following considerations will make this clear. Before the instrument is ready for use, the ionization chambers are disconnected from the grid, the grounding key is opened and the grid is allowed to assume its natural floating potential. Adjustment is then made of the potential of one point in the anode-cathode system (by means of slider 12) to bring the floating potential of the grid to ground potential. The ionization chambers are then connected to the grid and when the grounding key 8 is opened there must not be any appreciable change in plate current otherwise incorrect measurements are obtained. This means that the connection of the ionization chambers to the grid has not disturbed its potential with respect to the cathode and the grid is still essentially a "floating grid" because the insulation resistance of the connected parts is of the same order of magnitude as that of the grid supports in the tube. When current passes through the ionization chambers and the system is balanced to determine the magnitude of the current, the grid is again at its floating potential derived entirely from the electron stream. If this is not the case the measurement is incorrect.

What I claim as new and useful and desire to secure by United States Letters Patent is:

1. In combination, a source of current to be measured, a standard source, a floating grid electron discharge device connected to both said sources, means for automatically varying the current from the standard to maintain the anode current of said device at a predetermined value corresponding to ground potential of said floating grid, said last mentioned means including a motor normally at rest when said anode current is at said predetermined value, and means for operating said motor in accordance with said anode current.

2. In combination a source of current to be measured, a standard source, a floating grid electron discharge device connected to both said sources, means for automatically varying the current from the standard to maintain the anode current of said device at a predetermined value corresponding to ground potential on the grid, said last mentioned means including a master motor adapted to run at a selected normal speed, and means for changing the motor speed in accordance with changes in the anode current.

3. The combination according to claim 2 in which the means for automatically varying the current from the standard also includes a pair of motors connected to an adjustable potentiometer and means including a pair of motors adapted to be selectively operated in accordance with the speed of said master motor.

4. The combination according to claim 2 in which the means for automatically varying the anode current also includes a centrifugal switch.

5. In combination a floating grid electron discharge device, two sources of current differentially connected to the grid of said device, means for automatically controlling the current from one of said sources and a centrifugally operated switch for varying the operation of said current controlling means.

6. The combination according to claim 5 in which means is provided for making a visual record of the changing positions of said current controlling means.

7. In combination, a floating grid electron discharge device, a plurality of current sources differentially connected to the grid of said device, a reversing switch controlled by the anode current of said device, a plurality of motors controlled by said reversing switch, and means for making a visual record controlled by said motors.

8. The method of electric measurement employing a detector of the control grid electron discharge type which comprises translating the energy forms to be measured into a corresponding potential drop, adjusting a point in the anode-cathode system of an electron discharge device to such a potential with respect to ground that the control electrode of said device assumes ground potential for which these is a corresponding value of anode current, applying said potential drop to said control electrode after said control electrode has been so adjusted, applying a potential drop from a standard source to said control electrode, and varying the potential drop from said standard until the anode current of said electron discharge device is of the same value as said corresponding value when the grid assumed ground potential prior to the application thereto of the first potential drop.

9. In an electrical measuring system, an electron discharge device having a cathode-anode system, and at least one floating grid, and means for adjusting the potential of a point in said system relatively to a fixed base potential to bring said grid to said fixed potential while maintaining said grid floating.

10. In a system for detecting weak currents, an electron discharge device having a cathode-anode system and at least one floating grid, and means for varying the potential of a point in said system with respect to ground to bring said grid to ground potential while maintaining said grid floating.

11. In combination a cathode and anode system, a floating grid for said system, and a source of potential between said system and ground for bringing said free grid to ground potential while maintaining said grid floating.

12. In combination a first source of potential, a second source of potential, means interconnecting said sources in series, means for utilizing any desired fraction of the potential of one of said sources to bring said interconnecting means to a fixed base potential, and means including a floating grid electron discharge device adapted to be connected to said interconnecting means for determining when said base potential is reached, the grid of said device being adjusted to static ground potential prior to being connected to said interconnecting means and while maintaining said grid conductively isolated from ground.

13. In a radiation measuring system means for producing an electric charge of known value, means for producing an electric charge of value corresponding to the radiation to be measured, and means for comparing both said charges, including a floating grid electron discharge device and circuit arrangements for adjusting the said grid to static ground potential while maintaining said grid conductively isolated from ground.

14. A measuring system comprising a pair of ionization chambers each having a pair of spaced electrodes therein, means connecting one electrode of one chamber with one electrode of the other chamber, means for applying a positive potential to the second electrode of one chamber and a negative potential to the second electrode of the other chamber, and means connected to said interconnected electrodes for detecting a change in potential in said inter-connection, the last mentioned means including an electron discharge device having a cathode, an anode and a floating control electrode at ground potential said ground potential being derived substantially entirely from the electron stream from the cathode.

15. A system according to claim 14, in which the medium in one of said chambers is ionized by a standard source of ionizing radiations and the medium in the other chamber is ionized by a source whose value is to be determined.

16. A measuring system comprising a pair of devices each having a pair of spaced electrodes mounted therein, a uni-potential connection from an electrode of one device to an electrode of the other device, means for impressing a positive potential on the other electrode of one device, and for impressing a negative potential on the other electrode of the other device, means for producing a stream of negative electrons in a system between an anode and a cathode, a grid electrode positioned in said stream, and means for adjusting the potential of a point in the anode-cathode system to bring said grid electrode to ground potential while said grid is conductively isolated from ground, and means connecting said grid electrode to said unipotential connection.

17. In a measuring system for feeble energy manifestations, a device for translating said energy manifestation into an electric current, a comparison standard connected in series with said source, a remotely located indicating device and means connecting said device to a point between said device and said standard for causing said indicator to indicate when said point is at a predetermined potential, the said last mentioned means including an electron discharge device having a floating-grid, and circuit arrangements for adjusting the potential of a point of the anode-cathode system of said device relative to ground to bring said grid to ground potential while maintaining it floating, whereby the indications of said indicator are substantially independent of the length of the connecting leads between the first mentioned point and the indicating device.

18. In a measuring system a detector comprising a vacuum tube having an anode cathode system including an electron-emitting cathode and an anode, and a control electrode, means to adjust a point in the anode-cathode system of said tube with respect to ground to bring the floating potential of the control electrode to ground potential while maintaining said electrode floating, and means to directly ground said electrode to determine when said floating ground potential is reached.

19. An arrangement for detecting potential variations of a point in an electric circuit comprising a floating grid audion, means to supply an adjustable potential between a point in the anode-cathode system of said audion and ground to bring the grid to floating ground potential, means to connect said grid to said point, and means to vary the current flow in said circuit to restore the grid to floating ground potential while maintaining it floating.

20. In an electrical measuring system the combination of a detector of the audion type wherein the control grid is at ground potential while floating, means to translate the energy to be measured into corresponding electric charges, a standard source to produce electric charges of known magnitude, a connection between said means and said source to combine said charges, and means to connect said connection to the grid of said device while maintaining said grid conductively isolated from the cathode of the audion to detect whether said connection is at ground potential.

21. The method of electric measurement employing a detector of the floating grid audion type which comprises adjusting the potential of a point in the anode-cathode system of the detector with respect to ground while maintaining the grid conductively isolated from ground for the purpose of maintaining the grid at substantially ground potential during the period of measurement, temporarily connecting said grid conductively to ground and continuing said adjustment until the anode current produced by said adjustment is the same value as when said grid is conductively connected to ground.

22. The method of electric measurement employing a detector of the floating grid audion type which comprises translating energy manifestations to be measured into a corresponding electric current, combining said current with current from a standard source and applying the combined currents to said grid, adjusting the potential of a point in the anode-cathode system of the detector with respect to ground while maintaining the grid conductively isolated from ground for the purpose of maintaining the grid at substantially ground potential during the period of measurement, and temporarily connecting said grid conductively to ground to determine whether it is maintaining its adjusted potential, as indicated by the fact that the anode current produced by said adjustment is substantially the same as when the grid is conductively connected to ground.

23. The method of detecting the magnitude of energy manifestations employing an electron discharge device of the floating grid audion type which comprises controlling the current flow in a circuit by said energy manifestations, detecting the potential condition of a point in said circuit by connecting the grid of the audion to said point, adjusting the potential of a point in the anode-cathode system of the audion with respect to ground while maintaining said grid conductively isolated from ground for the purpose of maintaining said grid at substantially ground potential during the period of detection, temporarily connecting said grid conductively to ground to determine whether said grid is maintaining its adjusted potential as indicated by the fact that the anode current is substantially the same when the grid is conductively grounded as when it is at said adjusted potential.

24. The method of detecting and measuring potential change of a point in an electric circuit employing a detector of the floating grid audion type which comprises, connecting the grid to said point, adjusting the potential of said grid to substantially ground potential while maintaining it conductively isolated from ground by adjusting the potential of a point in the anode-cathode system of the detector with respect to ground, and temporarily conductively connecting the grid to ground to check said adjusted potential.

25. In an electric measuring system the combination of an electric circuit including means for producing an electric charge of known magnitude and means for producing an electric charge of unknown magnitude, and means for determining the potential of a selected point in said circuit the last-mentioned means including an electron discharge device having a cathode-anode system and at least one control electrode, and means for adjusting the potential of a point in said system relatively to a fixed base potential source while maintaining said control electrode conductively isolated from said source for the purpose of maintaining said control electrode at substantially the value of said fixed potential during the period of measurement.

26. An electric measuring system according to claim 25 in which the means for producing one of said charges includes a source of potential and a capacity connected in series in said circuit.

27. An electric measuring system according to claim 25 in which the means for producing one of said charges includes a source of potential and a capacity connected in series in said circuit and at least one of which is adjustable.

28. An electric measuring system according to claim 25 in which the means for producing one of said charges includes an ionization chamber and a source of potential connected in series in said circuit.

29. An electric measuring system according to claim 25 in which the means for producing the electric charge of unknown magnitude includes a photo-electric device.

30. In a radiation measuring system, means for producing an electric charge of known value, means for producing an electric charge of value corresponding to the radiation to be measured, and means for comparing both said charges including a source of fixed base potential, a floating grid electron discharge device and circuit arrangements to bring said grid to the value of said fixed base potential and to maintain it substantially at said value during the period of measurement and while it is conductively isolated from said source.

31. A radiation measuring system according to claim 30 in which the means for producing the electric charges includes an ionization chamber, and potential adjusting means connected between said grid and said source.

32. A radiation measuring system according to claim 30 in which the means for producing one of said charges includes a capacity and a potential adjusting device connected between said grid and said source.

33. A measuring system comprising a circuit containing a pair of devices each having a pair of spaced elctrodes, a uni-potential connection from an electrode of one device to an electrode of the other device, means for impressing a positive potential on the other electrode of one device and for impressing a negative potential on the other electrode of the other device, an anode and a cathode with a circuit therebetween and means for producing a stream of negative electrons in said circuit, a control electrode positioned to control said stream, means for bringing said control electrode to a chosen base potential and for maintaining said electrode at substantially the value of said chosen base potential during the period of measurement but while said grid is conductively isolated from said circuit, and means connecting said control electrode to said unipotential connection.

34. A system according to claim 33 in which said base potential is ground potential.

35. A system according to claim 33 in which one of said pair of devices is a condenser.

36. A system according to claim 33 in which one of said pair of devices is an ionization chamber.

37. A system according to claim 33 in which one of said pair of devices is a photo-electric cell.

38. In a measuring system a detector comprising a vacuum tube having a cathode-anode system including an electron-emitting cathode, an anode and a control electrode, means to apply temporarily a direct checking ground potential to said control electrode, and means to adjust a point in the anode-cathode system of said tube with respect to ground to maintain said control electrode at substantially ground potential while said control electrode is conductively isolated from ground.

39. In an electrical measuring system the combination of a detector of the audion type wherein the control electrode is at ground potential while it is conductively isolated from the cathode, means to translate the energy to be measured into corresponding electric charges, a standard source to produce electric charges of known magnitude, a connection between said means and said source to combine said charges, means to connect said connection to said control electrode while maintaining said control electrode conductively isolated from the cathode to detect whether said connection is at ground potential, and means to apply temporarily a direct checking ground potential to said control electrode.

GIOACCHINO FAILLA.